Sept. 13, 1966      G. P. SMITH ET AL      3,272,686

STRUCTURAL CERAMIC BODIES AND METHOD OF MAKING SAME

Filed March 23, 1962

INVENTORS
GAIL P. SMITH
GUY E. STONG
BY
Clarence R. Patty, Jr. &
Brown, Critchlow, Flick & Peckham
ATTORNEYS 3,272,686
STRUCTURAL CERAMIC BODIES AND METHOD OF MAKING SAME
Gail P. Smith, Corning, and Guy E. Stong, Elmira, N.Y., assignors to Corning Glass Works, Corning, N.Y., a corporation of New York
Filed Mar. 23, 1962, Ser. No. 182,011
5 Claims. (Cl. 161—68)

This invention relates to structural ceramic bodies in which the essential internal portions are cellular or of honeycomb construction.

It is an object of this invention to provide lightweight structural ceramic bodies having cellular or honeycomb internal construction, that have a high strength to weight ratio, that are easily prepared with readily available materials, and that are strong and are capable of withstanding high temperatures without destruction.

These and other objects are attained in accordance with our discovery in which structural ceramic bodies are prepared by joining sheets of ceramic material with a composition composed of about 1 to 16 percent of lead oxide, about 1 to 15 percent of fluoride and oxide fluxes, at least one member of the group consisting of 1 to 6 percent of silicon carbide and 1 to 6 percent of sulfur trioxide, and the remainder substantially all a lithium aluminosilicate ceramic material. The lithium aluminosilicate ceramic material is ordinarily at least 70 weight percent of the total composition. Where the ceramic sheets are not the only relatively rigid ceramic structural members present, either the sulfur trioxide or the silicon carbide can be omitted from the composition. Thus, where a honeycomb body is involved, a honeycomb is placed between the sheets and in that instance the composition just given generally is free from the sulfur trioxide or the carbide. The term honeycomb in this specification means a unitary body having a multitude of generally parallel air-containing channels of any size and shape, each such air channel being separated from one another by a wall of ceramic material.

The invention will be most readily understood by considering its description in conjunction with the attached drawing in which.

Figure 1:
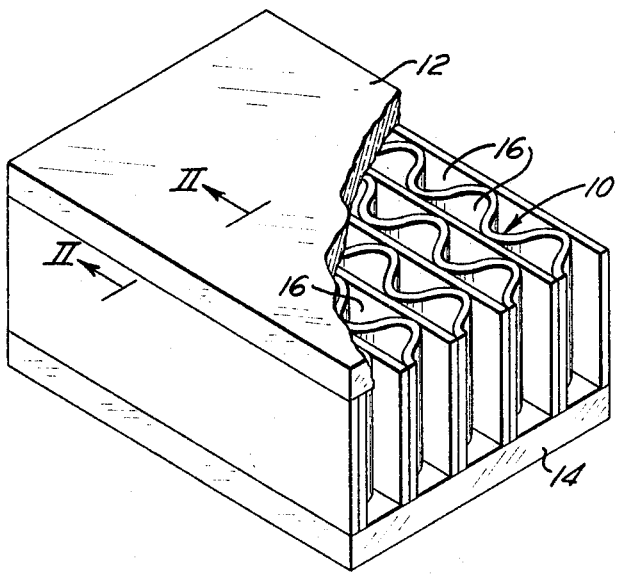
FIG. 1 is a perspective view with parts broken away of a honeycomb structural ceramic body of the invention.
Figure 2:
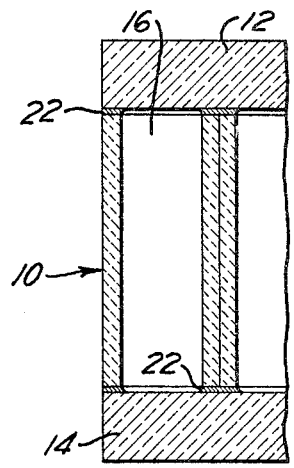
FIG. 2 is a fragmentary sectional view taken along line II—II of FIG. 1.

Referring now to the drawing, a honeycomb structural body of the invention includes a central ceramic honeycomb 10 disposed between and in contact with opposing sheets 12 and 14 made of a ceramic material. The honeycomb air channels 16 extend from the largest two facings of that body and thus become covered and substantially sealed by the rigid ceramic sheets 12 and 14. The sheets 12 and 14 are joined to the honeycomb 10 at its major faces by a sintered ceramic 22 (FIG. 2) made from a composition hereinafter detailed.

The ceramic sheets 12 and 14 are made by any of a variety of processes now available to the art such, for example, as fusion-casting, drawing, slip-casting, pressing or the like, followed by firing, if necessary, to provide ceramic bonding. It is also within the scope of the invention to provide the ceramic sheets 12 and 14 with their final desired physical properties during the joining process. For example, by using a sheet of suitable composition, it can be converted to a glass ceramic while the ceramic 22 is being sintered thereto. The ceramic materials used for making the sheets can vary widely, the only significant limitation being that sheets produced have a low coefficient of thermal expansion that is similar to that of the honeycomb body and the cement used. Typical ceramic materials that can be used are indicated hereinafter in the discussion of forming the honeycomb.

Ceramic honeycomb body 10 is prepared by depositing pulverized ceramic material and a binder on a flexible carrier, corrugating the resulting coated carrier, forming an article of the desired shape from corrugated and non-corrugated carriers and thereafter firing the composite article to sinter the ceramic particles to produce a unitary structure. The purpose of the binder is to bond the unfired ceramic material to the carrier, to impart green strength to the coated carrier, and to retain the formed unfired article in the desired shape after forming and prior to sintering. In order that the resultant article be essentially all ceramic material having a low coefficient of thermal expansion, it is preferred to use an organic binder especially those that are heat curable or thermosetting, that can be removed by decomposition and/or volatilization when the article is fired. Among the many materials having the requisite, well-known characteristics of binders that can be used are such natural materials as gum arabic, colophony, and shellac, and such synthetic organic resins as acrylate resins, methacrylate resins, alkyd resins, cellulose derivatives, coumarone-indene resins, epoxy resins, furane resins, polyisobutylene, isocyanate resins, phenolic resins, polyamides, polyesters, resorcinol resins, styrene resins, terpene resins, urea resins, vinyl resins, chlorinated paraffins, and melamine resins.

The purpose of the carrier is to provide support for the unfired coating to allow it to be formed to the desired shape prior to sintering the ceramic coating. Tea bag paper is a preferred carrier and a list of other suitable materials is disclosed in the Hollenbach patent application, Serial No. 759,706, filed September 8, 1958, now Patent No. 3,112,184, to which reference can be made. Tea bag paper, as well as other organic film materials, substantially decomposes upon firing and thus results in an article consisting almost entirely of ceramic material.

Typical sinterable ceramic material suitable for forming honeycombs to be used in the present invention include lithium aluminosilicates such as, for example, glass or crystalline petalite and beta spodumene, glass-ceramics having a lithium aluminosilicate base and especially those made in accordance with Example 1 of United States patent to Stookey, Number 2,920,971, as well as mixtures of any of the foregoing materials. Petalite glass-ceramic mixtures generally include about 10 to 40 weight percent of the glass ceramic and the remainder petalite. Beta spodumene-petalite mixtures usually contain about 1 to 4 parts of petalite for each 4 to 1 parts of beta spodumene. A typical refractory composition that is used for making honeycombs of low thermal expansion and high thermal shock resistance consists of, by weight, 95 percent of petalite and 5 percent of talc. Another example that can be used for either or both of the sheets and the honeycomb consists of 75 parts by weight of petalite and 25 parts by weight of a glass ceramic having the following approximate composition by oxide analysis: 70 percent $SiO_2$, 18 percent $Al_2O_3$, 5 percent $TiO_2$, 3 percent $Li_2O$, 3 percent $MgO$ and 1 percent $ZnO$. Another satisfactory mixture is composed of, by weight, 28 percent of beta spodumene and 72 percent of petalite. The ceramic materials selected for the honeycomb or the facing sheets will be those found to be most suitable, considering the properties, for the conditions to be encountered in use.

In forming honeycombs, the organic binder and sinterable ceramic material are applied to the carrier in any manner desired. For example, spraying, dipping or brushing a suspension of the ceramic in the binder on to the carrier can be practiced, or those materials can be applied separately or consecutively by such procedures. Thereafter, the coated carrier is shaped as by crimping or multiple-folding, hereinafter called corrugating.

Honeycomb structures are fabricated from the coated carriers in a variety of ways. These structures can be fabricated from multiple layers of films corrugated with the same pattern, with alternate layers laterally disposed a distance equal to half of the width of individual pattern so that layers do not nest into each other. Or the honeycomb structure can be formed from multiple layers of films corrugated with different patterns, or by using alternate layers of flat coated carriers between corrugated layers.

The firing of the green honeycomb structure or matrix is accomplished in the normal manner in the ceramic arts by placing the article in a furnace and heating it at a rate slow enough to prevent breakage due to thermal shock to a temperature high enough to cause the ceramic particles to sinter. While the firing schedule, including heating rates and sintering temperatures, will vary depending upon the ceramic materials utilized and the size and shape of the article formed, the details of such schedules are not critical and suitable conditions are readily determinable by one skilled in the art of firing ceramic articles.

Further details on forming honeycombs of the type contemplated can be found in the Robert Z. Hollenbach Patent No. 3,112,184, issued November 26, 1963.

An important aspect of the invention and which contributes to producing sound structural products is the composition by which honeycomb 10 and ceramic sheets 12 and 14 are joined. The composition for this purpose is a powdered mixture containing, by weight, about 1 to 16 percent of lead oxide, about 1 to 15 percent of fluoride and oxide fluxes, 1 to 6 percent of silicon carbide or sulfur trioxide and the remainder a lithium aluminosilicate ceramic material. Suitable lithium aluminosilicate ceramic materials have been indicated hereinbefore in connection with the materials used in forming honeycombs.

The silicon carbide and the sulfur trioxide together cause foaming and preferably are used in substantially equal amounts or about 2 to 4 percent each when foaming is desired. Either of them is omitted when no foaming is to occur. As is ordinary in the glass and ceramic arts, the sulfur trioxide content of the batch is provided by a sulfate, and such sulfates as calcium sulfate, barium sulfate, strontium sulfate, magnesium sulfate, zinc sulfate, cadmium sulfate, lead sulfate, lithium sulfate, sodium sulfate and potassium sulfate can be used for this purpose. In addition to the sulfur trioxide content, these sulfates also provide the corresponding oxide that in the instance of lead sulfate contributes to the necessary lead oxide content and in the other instances contributes an oxide flux.

Typical fluxes that can be used include lead fluoride, zinc fluoride, barium fluoride, calcium fluoride, magnesium fluoride, strontium fluoride, lithium fluoride, sodium fluoride, potassium fluoride and cadmium fluoride. Mixtures of flux materials, for example, calcium fluoride and zinc fluoride, can also be used to assist in obtaining the desired fluxing action and a minimum effect on the coefficient of expansion. Similarly, the corresponding oxides can be used at least in part for the fluoride fluxes just mentioned. For example, combination fluxes of zinc oxide, magnesium fluoride and calcium fluoride, of zinc oxide, magnesium oxide, magnesium fluoride and calcium fluoride, and of zinc oxide and calcium fluoride can also be used in producing useful compositions. Barium and calcium fluorides have a pronounced effect in increasing the expansion coefficient, and can be used in amounts calculated to produce the desired level of that property.

Within the foregoing ranges of cement compositions are intermediate ranges that are preferred because of intended applications, a particular property or the like. For example, it is preferred that one of the mentioned fluoride fluxes be present in an amount of about 0.5 to 10 percent and that there be present at least one other flux also in an amount of 0.5 to 10 percent and selected from the group consisting of fluorides and oxides of zinc, barium, calcium, magnesium, strontium, lithium, sodium, potassium, and cadmium, with the total amount of the flux being not greater than 15 percent. An overall general preferred composition contains about 4 to 10 percent of lead oxide, 2 to 4 percent of silicon carbide, 2 to 4 percent of sulfur trioxide, 1 to 3.5 percent of calcium fluoride, 1 to 10 percent of zinc oxide, up to 6 percent of zinc fluoride, up to 3 percent of magnesium oxide, up to 6 percent of magnesium fluoride, with the total of calcium fluoride, zinc oxide, zinc fluoride, magnesium oxide and magnesium fluoride being in the range of about 8 to 13 percent, and the remainder glass petalite. This range of compositions defines foaming cements and the same composition omitting either, but not both, of the silicon carbide or sulfur trioxide is the preferred range for nonfoaming cement compositions.

In preparing the composition for joining the facing sheets and the honeycomb, premixing usually is practiced sufficiently to obtain uniformity of the composition. The particle size of the components generally is at least minus 200 mesh (Tyler) and preferably minus 325 mesh down to an impalpable fineness. Thorough mixing and fine particle size contribute to the production of a sound bond. The components can be dry mixed, or wet mixed, or both. Wet mixing has been found suitable since the ceramic members being joined generally are porous and liquids can escape through those members. Any liquid can be used that does not deleteriously affect the character of the composition; water and such organic liquids as butyl alcohol, toluene or the like as well as mixtures of them are satisfactory.

In forming honeycomb structural articles in accordance with this invention, a honeycomb body of the type described and preferably of a thickness of about ½ to 2 inches with its channel openings extending to its two largest faces is used. The bonding composition, for example a finely ground and thoroughly mixed mixture of, by weight, 8 percent lead oxide, 4 percent calcium fluoride, 4 percent zinc fluoride, 3.35 percent silicon carbide and the remainder glass petalite, is placed on the surface of one of the ceramic sheets. Then the honeycomb is placed on top of the composition. Afterwards, some of the composition is placed on the face of the other ceramic sheet and that face is put on the honeycomb. The resulting sandwich is clamped lightly and then placed in a furnace.

The composition sinters and chemically bonds to the honeycomb and facing sheets in accordance with this invention at about 1050° to 1250° C., and generally at 1050° to 1150° C. Accordingly, the assembly is heated to that temperature and maintained until sintering is completed which usually occurs in about ½ to 2 or 3 hours or more. Thereafter, the assembly is cooled to handling temperature. The resulting structure is strong and lightweight and is a good insulator. It can be used in structural applications such as the leading edges and for insulating surfaces in aircraft and guided missiles .

Figure 3:
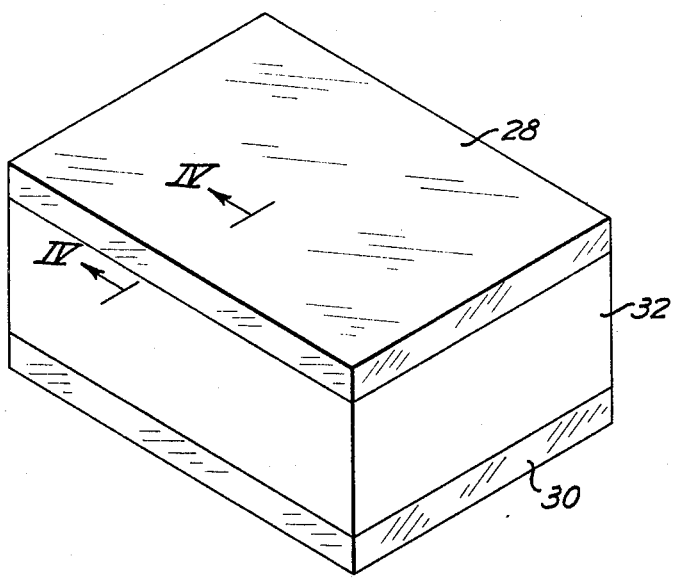
FIG. 3 is a perspective view of a cellular structural ceramic body of the invention.
Figure 4:
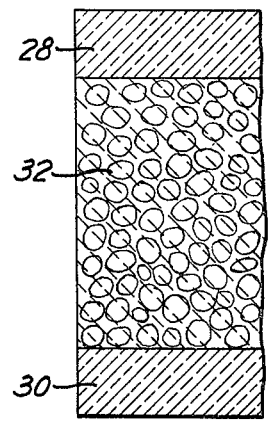
FIG. 4 is a fragmentary sectional view taken along line IV—IV of FIG. 3.

Referring again to the drawing, and especially FIGS. 3 and 4, a cellular structural ceramic body of the invention is composed of two ceramic facing sheets 28 and 30 that are spaced from one another by a cellular ceramic material 32 that also serves to join those sheets. The cellular ceramic material 32 is produced in situ as indicated hereinafter, and in the set condition comprises a rigid ceramic, having entrapped bubbles, that is structurally bonded to each of the sheets.

The cellular ceramic material is made from the same materials and range of analyses given hereinbefore for the joining composition for the honeycomb structural ceramic bodies but includes both the sulfur trioxide and the silicon carbide. The sulfur trioxide and carbide combination causes the composition to foam, to a volume within about 200 to 1000 percent of its original volume, at a temperature of about 1050° to 1250° C. In use, the composition foams to fill the space between the ceramic facing panels and simultaneously bonds to the facing panels. Thus, the internal structure of the resulting unit is lightweight.

In making such a cellular structural ceramic body, two thin ceramic sheets are placed in a thin open-top mold against opposite sides. Thus, a cavity is defined between those ceramic sheets. The ceramic sheets can be made of any composition desired having a low coefficient of thermal expansion, but those given hereinbefore as the ceramic materials for honeycomb construction are preferred. Then a foamable composition composed, for example, of, by weight, 8 percent of lead oxide, about 4 percent of calcium fluoride, about 4 percent of zinc fluoride, about 3.35 percent of silicon carbide, about 3.35 percent of barium sulfate and the remainder glass petalite, which has been ground very finely and thoroughly mixed, is poured into the space. For sheets 2 x 3 feet spaced 2 inches apart and a cement of 60 pounds per cubic foot density and that would foam to 300 percent of its original volume, as little as 20 pounds of the cement could be used though 25 or 30 pounds would be preferable. The mold is then placed in a furnace and heated to the temperature range of 1050° to 1250° C. After about one or two hours at that temperature, in which foaming and bonding occur, the mold is cooled to handling temperature. The resulting product can be used for the same applications as indicated for the honeycomb product.

From the foregoing discussion and description, it is evident that the present invention provides structural bodies made wholly of ceramics. The resulting products are strong and lightweight. In view of the materials that are used in preparing them they are capable of withstanding relatively high temperatures such as would be generated by air friction and high temperature gradients. The nature of the materials used and the practices followed in producing the resulting articles contribute to making them inexpensive.

While most instances will use the foaming cement in the absence of structural members between the sheets being joined, it should be apparent that the foaming cement can also be used in that instance. Indeed, where a space exists between the internal surfaces of the facing members and the honeycomb, the use of the foaming cement readily fills that space while serving to bond those members.

Another advantageous practice of the invention involves using the pressure exerted by foaming to provide the final shape of the structural member being produced. In this embodiment of the invention, the mold is made in the desired shape. The thin ceramic sheets are placed in the mold. At least one of the sheets in this instance, however, need not conform to the mold, but must be deformable without fracture at the foaming temperature of the cement used. Thus, sheets that become soft at the foaming temperature are used. Then when the cement is heated to foam and sinter it, the pressure exerted by the expanding cement forces the then softened ceramic sheets to conform to the mold shape. That shape is retained upon cooling. In a typical practice of this embodiment, glass-ceramic sheets 0.040 inch thick and having an oxide analysis, by weight, of about 70 percent $SiO_2$, 18 percent $Al_2O_3$, 5 percent $TiO_2$, 3 percent $Li_2O$, 3 percent MgO and 1 percent ZnO can be used. The undeformed sheets are spaced from one another in a mold having the configuration desired as the final shape. A foaming cement composed, by weight, of 8.74 percent Zni, 1.30 percent $CaF_2$, 3.46 percent SiC, 2.87 percent $SO_3$, 8 percent PbO and the remainder petalite, is placed between the sheets in an amount greater than would be used where deformation was not desired. The assembly is then heated to the foaming temperature, i.e., about 1200° C. and held until foaming and sintering is complete. At 1200° C., the glass-ceramic sheets soften and easily deform to the mold shape under the pressure of the expanding, foaming cement. Thereafter, the product is cooled to handling temperature. It might be noted that the usual deformation practiced is on the order of producing a radius of curvature in the sheets that is at least several times their length, for example, 3 or 4 or more times the length.

All percentages are intended to be by weight unless otherwise indicated or apparent. A low coefficient of thermal expansion within the meaning of this invention is minus 10 to plus $20 \times 10^{-7}/$° C. from room temperature to 300° C.

In accordance with the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A method of making a structural ceramic body comprising sandwiching a ceramic honeycomb body between two spaced sheets of ceramic material having a low coefficient of thermal expansion relatively similar to that of said honeycomb body, providing a composition composed, by weight, of about 1 to 16 percent of lead oxide, about 1 to 15 percent of a flux, at least one member selected from the group consisting of sulfur trioxide and silicon carbide in an amount of about 1 to 6 percent, and the remainder substantially all a lithium aluminosilicate ceramic material having a low coefficient of thermal expansion in contact with said honeycomb body and said ceramic sheets at their points of contact, and heating the resulting unit to sinter said composition to said honeycomb and said ceramic sheets to provide a unitary structure.

2. A method of making a structural ceramic body comprising spacing in essentially face-to-face relationship two ceramic sheets, disposing in the resulting space between said sheets a composition composed, by weight, of about 1 to 16 percent of lead oxide, about 1 to 15 percent of a flux, about 1 to 6 percent of silicon carbide, about 1 to 6 percent of sulfur trioxide and the remainder substantially all a lithium aluminosilicate ceramic material having a low coefficient of thermal expansion, heating the sheets with said composition in place to a temperature of about 1050° to 1250° C. to foam said composition and sinter it to said sheets, then cooling the resulting unit to handling temperature.

3. A structural ceramic body comprising spaced rigid ceramic sheets joined to one another by a foamed composition composed, by weight, of about 1 to 16 percent of lead oxide, about 1 to 15 percent of a flux, about 1 to 6 percent of silicon carbide, about 1 to 6 percent of sulfur trioxide and the remainder a lithium aluminosilicate ceramic material, said ceramic material and said ceramic sheets having a low coefficient of thermal expansion.

4. A structural ceramic body comprising a ceramic honeycomb having opposed major surfaces, channels extending through said honeycomb and terminating at said surfaces, a rigid ceramic sheet ceramically bonded to each of said major faces by a composition composed, by weight, of about 1 to 16 percent of lead oxide, about 1 to 15 percent of a flux, about 1 to 6 percent of a member selected from the group consisting of silicon carbide and sulfur trioxide, and the remainder substantially all a lithium aluminosilicate ceramic material, said honeycomb, ceramic sheets and ceramic composition having a low coefficient of thermal expansion.

5. A method of making a structural ceramic article from a foamable ceramic cement and two ceramic sheets having a low coefficient of thermal expansion at least one of which has an initial shape different from the desired shape, comprising spacing said sheets in essentially face-to-face relationship in a form having the desired shape, disposing between said sheets a cement composition composed, by weight, of about 1 to 16 percent of lead oxide, about 1 to 15 percent of a flux, about 1 to 6 percent of silicon carbide, about 1 to 6 percent of sulfur trioxide and the remainder substantially all a lithium aluminosilicate ceramic material having a low coefficient of thermal expansion, heating said sheets with said cement in place to a temperature of about 1050° to 1250° C. to foam said cement and sinter it to said sheets, at least said ceramic sheet having the shape different from the desired shape having a softening temperature at said foaming temperature whereby it deforms to the desired shape upon the foaming of said cement, and then cooling the resulting article to handling temperature.

References Cited by the Examiner
UNITED STATES PATENTS

| | | | |
|---|---|---|---|
| 2,485,724 | 19/1949 | Ford | 264—43 |
| 2,744,042 | 5/1956 | Pace | 156—79 |
| 2,920,971 | 1/1960 | Stookey | 106—39 |
| 2,937,938 | 5/1960 | Fiedler et al. | 75—20 |
| 2,977,265 | 3/1961 | Forsberg et al. | 161—53 |
| 3,174,870 | 3/1965 | Connelly et al. | 106—40 |

EARL M. BERGERT, *Primary Examiner.*

H. F. EPSTEIN, *Assistant Examiner.*